Oct. 13, 1936.                P. ROBINSON                2,057,314
                          ELECTROLYTIC DEVICE
                        Original Filed July 1, 1931
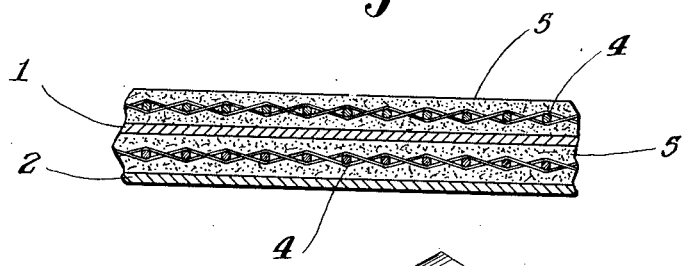
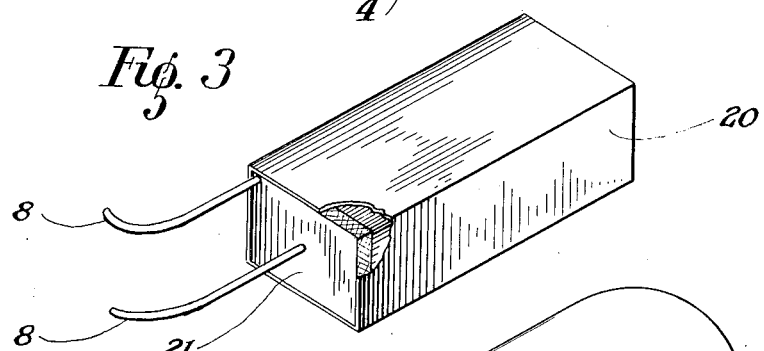
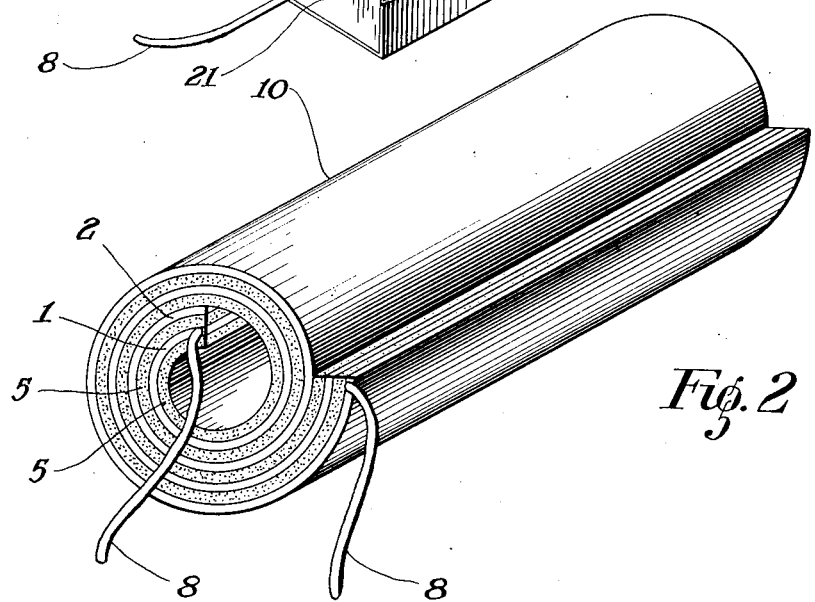
PRESTON ROBINSON
    INVENTOR.
BY  Dorsey + Cole
        ATTORNEYS.

Patented Oct. 13, 1936

2,057,314

UNITED STATES PATENT OFFICE 2,057,314

ELECTROLYTIC DEVICE

Preston Robinson, Williamstown, Mass., assignor to Sprague Specialties Co., North Adams, Mass., a corporation of Massachusetts Application July 1, 1931, Serial No. 548,270
Renewed November 23, 1935

24 Claims. (Cl. 175—315)

My invention relates to electrolytic devices, and more particularly to electrolytic condensers with aluminum or similar film-forming electrodes having electrolytes which are not highly liquid.

Various attempts have been made in the past to manufacture electrolytic condensers which have an electrolyte of low fluidity, and electrolytes ranging from slightly viscous to substantially solid in consistency have been therefore proposed.

Condensers using such electrolytes are generally referred to as semi-dry or dry, and their advantages compared with highly liquid or wet electrolytic condensers are numerous. The main advantages are smaller amount of electrolyte, reduced size and more compact construction, lower cost, absence of leakage of the electrolyte, elimination of the danger of freezing of the electrolyte, less expensive containers and the possibility of mounting the condensers in any desired position.

In spite of the above advantages inherent to semi-dry and dry condensers, such condensers have met with a limited success only, because their electric characteristics have been inferior and their life shorter than that of wet electrolytic condensers of good quality.

Previous attempts to make semi-dry and dry condensers have been generally based on the faulty assumption that it is desirable to remove all water from the electrolyte. Attempts have also been made to eliminate solvents altogether and to use dry salts as electrolytes. This, as will be explained later, results in very high resistance electrolytes whereby the condenser acts almost like a resistor.

Other difficulties were encountered due to the evaporation of the solvent primarily because of the high resistance and high power factor of the condenser, and as the amount of solvent is reduced by evaporation, the resistance of the condenser further increases. This accounts for a very short useful life of the condenser.

The object of my invention is to provide semi-dry and dry electrolytic condensers which have the above enumerated advantages and at the same time equal in life and equal or even surpass in electric characteristics the best electrolytic condensers of the wet type. The main difference between the so-called wet and the present semi-dry or dry electrolytic condensers is that the electrolyte of the wet condensers has generally a much lower specific resistance than the electrolyte of the semi-dry or dry type of condensers.

As a high internal resistance of the condenser is responsible for a high power factor, the electrolytic interspace between the electrodes of semi-dry and dry condensers is reduced as much as possible. While such reduction of the electrolytic interspace has the advantage of reducing the size of the condensers, it introduces various electrical and mechanical difficulties.

Such condensers are generally wound in rolls whereby the electrolyte is sandwiched between the metal foils constituting the electrodes. The prime endeavor was to provide an electrolyte of such consistency which affords proper separation of the electrode foils and is not liable to bleed out from between the foils. For this reason the main effort was directed towards reduction of the fluidity of the condenser, and, instead of water a more viscous solvent as glycerine or other alcohol was used. While in some cases a certain amount of water was present due to the hygroscopicity of the solvent, such water content was extremely small and as a rule uncertain.

Besides the solvent the electrolytes comprise salts, acids or alkalis and preferably a combination of a weak acid and a salt. For instance, an electrolyte comprising borax and boric acid or ammonium borate and boric acid is mostly used. However, various other acids and salts, either alone or in combination may give good results. For instance, besides boric acid, phosphoric acid, citric acid, tartaric acid and their salts are suitable for electrolytes, whereby the salts do not need to be those of the acid used in the electrolyte.

Further to reduce the fluidity of the electrolyte of semi-dry or dry condensers, it has been the practice to provide a considerable excess of such salts, acids or alkalis, hereafter for simplicity's sake referred to as salts. The result was that highly viscous, pasty or substantially solid electrolytes performed satisfactorily from the mechanical standpoint. However, the electric characteristics and the life of such condensers was unsatisfactory.

In an electrolyte comprising a salt and a solvent both the salt and the solvent in itself are essentially non-conductors and the sole vehicle for electric conduction is that portion of the salt which is dissolved in and ionized by the solvent.

Glycerine and other viscous alcohols used as solvents in semi-dry and dry electrolytic condensers to reduce the fluidity of the electrolyte are poor ionizing solvents when compared with water. The faculty of acting as an ionizing solvent depends on the dielectric constant of the solvent and with the same concentration of the salt for the different solvents the ionization of the salt and thus the electric conductivity of the electrolyte is proportionate to the third power of the dielectric constant of the solvent.

As the dielectric constants for water, glycerine and alcohol (at room temperature) are about 80, 39 and 25 respectively, the ionization obtained by water, glycerine and alcohol will be in the approximate proportions of 512, 59 and 15.6.

Thus if water is used as an ionizing solvent the specific conductivity of the electrolyte is more than eight times as great than in the case of glycerine and more than thirty-two times as great than in the case of alcohol.

Therefore, if glycerine and alcohol are used as the main ionizing solvents instead of water, the specific resistance of the electrolyte and the total internal resistance of the condenser is necessarily high. Such high internal resistance in its turn causes a high power factor, heating up of the condenser in operation and consequent vaporization of the solvent which further increases the resistance of the condenser and reduces its useful life.

In the condensers of my invention I use water as the prime ionizing solvent, thereby increasing the conductivity of the electrolyte. At the same time I reduce the fluidity of the electrolyte in such a way as not to seriously affect the resistance of the electrolyte nor other electric characteristic of the condenser.

With condensers of small electrolytic interspace, to obtain the best results, I have found that the water content of the electrolyte has to be kept within fairly narrow limits. If the water content is too low, as previously stated, the resistance of the condenser and its power factor increases. On the other hand, if the water content exceeds such limits the resistance of the condenser assumes a strongly negative characteristic, thus rapidly decreasing with increased voltages and temperatures with the result that the breakdown voltage of the condenser is materially lowered.

To reduce the fluidity of the condenser I may add in addition to the water another more viscous solvent as well as other substances as later more specifically described. It should be stated, however, that such viscous solvent only takes a minor part in the ionization, while the water being present in such quantities as determined by the above considerations, accounts for the major part of the ionization.

It should be also noted that with the same water content semi-dry or dry electrolytes of consistencies varying from fairly fluid to substantially solid may be obtained and at the same time the resistance and other electrical characteristics of the condenser remain unaffected with varying consistencies.

I have found, furthermore, that to obtain high quality semi-dry or dry electrolytic condensers various other factors enter into their manufacture, many of which have no or only a minor importance in the case of wet electrolytic condensers. The reason for such is not known to applicant in all instances. However, the main reason therefore seems to be the smallness of the electrolytic interspace between the electrodes and the pressure exerted by the electrolyte on the electrodes, none of which is present in wet electrolytic condensers.

As is generally accepted the dielectric of the filmed electrodes consists primarily of a gas layer of minute thickness which is interposed between the metal of the electrode and an oxide or hydroxide layer covering the electrode. Whereas, the oxide layer also contributes to the dielectric, the effectiveness of the dielectric is primarily dependent on the intactness of the gas layer. In case of the semi-dry and dry condensers, local pressure, resulting from inequalities in the electrolytic layer may injure and break down this gas film.

Thus I have found that while the thickness of the oxide film—(which in case of aluminum is a partly hydrated aluminum oxide film)—is not of prime importance for wet electrolytic condensers, in case of semi-dry or dry condensers, it is of utmost importance and it should be kept as thin as possible.

Apparently a thicker film will be less uniform and more porous which quite unfavorably affects the quality of the semi-dry and dry condensers. This lack of uniformity and greater porosity of thick films can be explained as follows: As the oxide film is formed on the metal it first forms on the outer surface of the metal and gradually penetrates inwardly. During film formation oxygen is liberated at the electrode which oxygen is only partly used up for film formation, the excess of it escapes through the film. As oxidation of the electrode progresses inwardly the oxygen liberated at the inner layers passes through the outside films already formed thereby increasing their porosity.

I have found that to obtain a thin film which is uniform and of small porosity the time of formation has to be greatly shortened compared to that generally used. At the same time instead of gradually increasing the forming voltage as is the present practice, I apply the full-forming voltage immediately and for a short time. I have, furthermore, found that to obtain the best results an aluminum of a purity in excess of that available in commercially pure aluminum is to be used.

Furthermore, I have found that it is advisable to form the film on the electrode before its assembly in the condenser and that the forming electrolyte should have a certain definite relation in regard to its hydroxyl ion concentration or pH with the pH of the electrolyte used in the condenser. The advantages thereby obtained are fully set forth in the co-pending application Ser. No. 536,072 filed May 8, 1931 of P. Robinson and J. L. Collins, now Patent No. 1,916,586, and will be also explained hereafter.

I have also found that in case the condensers are of the D C. type, in which only the anode needs to be of film-forming metal, it is preferable to make the cathode of non-filming metal or of a filming metal which is provided by a non-filming coating. The advantages hereby obtained are fully set forth in my co-pending application Ser. No. 531,001 of April 17, 1931, now Patent No. 1,938,464, and will be also explained hereafter.

Other improvements in the manufacture of the condensers will also appear hereafter.

I shall now proceed to describe my invention as embodied in condensers of the type used in filtering circuits for the elimination of ripples from rectified alternating current.

For such condensers only one of the electrodes, namely the anode, needs to be of film-forming metal, and for this I prefer to use aluminum foil of a thickness of the order of .002 to .004 inch.

For the formation of the film I prefer to use a forming tank in which the successive portions of aluminum foils are immersed and formed by a continuous or intermittent process.

The electrolyte is preferably an aqueous solution of a weak acid and a salt of a weak acid.

For instance, boric acid and borax might be used, although various other acids, as citric acid, phosphoric acid, tartaric acid, etc., and salts of such acids, may be used whereby the salts are not necessarily the salts of the acid used. Various other electrolytes previously suggested for electrolytic condensers and similar devices may also be successfully used.

In applying the forming voltage the aluminum foil constitutes the anode of the forming cell, whereas, a copper, carbon or other suitable non-filming conductor either in the form of the cell container, its lining or as an immersed electrode constitutes the cathode. It should be mentioned that prior to subjecting the aluminum foil to the filming process I prefer to subject it to a chemical or electro-chemical cleaning so as to remove all impurities as grease, soap, etc. as well as the oxide layer thereof. Preferably I use an alkali cleanser in the presence of an inhibitive agent as described in the co-pending application Ser. No. 526,118 filed March 28, 1931 of Preston Robinson and Joseph L. Collins, as the usual acidic cleansers tend to form an oxide coating on the aluminum which adversely affects the ultimate characteristics of the condenser.

As described in the above referred to Patent No. 1,916,586 to obtain the best results in electrolytic formation it is important to maintain the hydroxyl ion concentration or the pH of the electrolyte at a constant value.

A suitable electrolyte for film formation at 500 volts D. C. is, for instance, an aqueous solution of borax and boric acid, for example, six ounces of borax, fourteen pounds of boric acid and eighteen gallons of water. The pH of the electrolyte has a tendency to decrease during the formation and is preferably maintained constant by repeated addition of borax.

The forming voltage to be applied depends upon the ultimate break-down voltage required from the condenser, and different formation schedules may be employed.

However, to obtain a thin and uniform oxide film I found it preferable to apply immediately the maximum forming voltage. For instance, for condensers which are to operate at a maximum voltage of 500 volts, I prefer to use and apply immediately a forming voltage of 500 volts. Also as will be shown later the actual break-down voltage of these condensers can be raised above the forming voltage used by the proper selection of the electrolyte used in the condenser.

As stated previously, a thin and uniform film can be obtained by a rapid formation process, and I have found that such formation process can be greatly expedited by using aluminum of a purity exceeding that of the so-called commercially pure aluminum.

For instance, when using a forming voltage of 500 volts and a forming current of .6 amp. per square inch, commercially pure or 99.0% purity aluminum requires at least a formation time of 2 minutes. However, if 99.6% purity aluminum is used under same conditions, the formation period can be reduced to 30 seconds and below.

Using such high purity aluminum not only reduces the forming time and the expenses of formation, but also in reducing the oxide film to about one-fourth of its thickness, provides for a much better film, which is more uniform and less porous and gives higher quality condensers. For instance, condensers which otherwise are manufactured by the same process when using for anode aluminum foil of 99.0% purity have a power factor of 6%, whereas, the condensers using 99.6% purity aluminum foil have a power factor of only 3%. A still greater improvement in the leakage current is obtained as in case of the 99.6% aluminum the leakage current is only about one-third of that obtainable with 99.0% aluminum and after a period of idleness of the condenser the minimum leakage current is re-established after a much shorter time in case of 99.6% aluminum than in case of 99.0% aluminum.

As stated, the cathode in the case of D. C. current condensers does not require a film. Therefore, I prefer to use a non-filming electrode, for instance, lead or tin foil.

For mechanical reasons as well as in regard to cost aluminum foil is, however, the most suitable even for the cathode. However, as fully set forth in my co-pending application Ser. No. 531,001, now Patent No. 1,938,464, I have found that aluminum when used as cathode material causes the power factor of the condensers to increase and their capacity to decrease in operation.

This is due to the following reasons: Aluminum is subject to oxidization in air as well as in operation due to the oxygen liberated at the anode. Even if the oxide film, which is formed in air, is removed by the cleaning process previously described, oxidization in operation cannot be prevented. The oxide film thus chemically formed on the cathode is in some respects similar to the electrolytically formed film. In addition when such condensers are used to filter out the ripples of a rectified alternating current, the inverse ripples have a tendency electrolytically to form an oxide film on the cathode. The oxide film which is thus built up on the cathode during the operation of the condenser through chemical and electrolytical action, represents a capacity which is in series with the capacity of the anode film, thereby reducing the total capacity of the condenser. At the same time the cathode film causes the power factor of the condenser to increase.

To maintain the advantage of the aluminum as electrode material and at the same time prevent the objectionable film formation, I prefer to use for the cathode an aluminum foil the surface of which is provided with a coating or plating of chromium or other non-filming metal.

The condenser is assembled by rolling the formed anode foil and cathode foil together with a semi-liquid, pasty or solidified electrolyte interposed between the two foils. Thereby the assembled condenser may be given a substantially cylindrical or rectangular shape.

The electrolyte to be used in the condenser consists preferably of a weak acid and a salt, and an ionizing solvent. Similar salts and acids may be used in the condenser as have been proposed for the electrolytic formation. Thereby it is not necessary to use the same salts and/or acids in formation as in the final electrolyte.

However, as described in the co-pending application Ser. No. 536,072, now Patent No. 1,916,586, previously referred to, to obtain the most satisfactory results, the pH of the electrolyte used in the condenser should be lower than the pH of the forming electrolyte. Thereby the break-down voltage of the condenser is increased above the value of the maximum forming voltage used, as well as other improvements in the electric characteristics of the condensers are obtained.

For instance, in using the forming electrolyte given above, having a pH of 6 and applying a forming voltage of 500 volts, by using an electrolyte of 5.5 in the condenser, a break-down voltage of 550 volts is obtained. By using in the condenser an electrolyte of still lower pH the break-down voltage can be further increased.

As the main ionizing solvent I prefer to use water. However, to reduce the fluidity of the electrolyte I may add another ionizing solvent, as glycerine or another viscous alcohol. For instance, a very good proportion of the solvent is one part of weight water and three parts of weight of glycerine. As previously set forth, water is eight times as powerful an ionizing solvent as glycerine and it accounts in this case for more than 70% of the ionization obtained. Even in case of a solvent having one part of water and eight parts of glycerine, the water and the glycerine are responsible for equal amounts of ionization.

However, I prefer to maintain a larger proportion of water, as a rule about 15% to 25% of the solvent. A higher percentage of water is undesirable because it imparts the electrolyte a strongly negative resistance characteristic whereby increase of voltage or of temperature the resistance of the electrolyte is greatly decreased with a consequent heating up, and a reduction of the break-down voltage of the condenser. While decrease of the water content can be carried further and fair condensers can be obtained with a water content as low as 5%, a lowering of the water content, as previously explained, increases the resistance of the electrolyte which adversely affects the electric characteristics and life of the condenser.

If instead of glycerine another viscous oil, of lower dielectric constant than glycerine, is added to the water, the water is responsible for still a larger proportion of ionization. In general, however, the same conditions hold as above described.

The water may be added directly or may be contained in the salts and/or acids of the electrolyte.

For a condenser designed to operate at a maximum voltage of 500 volts and having a break-down voltage of 550 volts, a suitable electrolyte is one containing one pound of ammonium borate with 30% water content, one pound of boric acid with 45% water content, and three pounds of substantially water free glycerine. Such an electrolyte without further additions is a viscous liquid and the above given proportions of salt, acid and solvents represents approximately an optimum for the general performance of the condenser. For instance, with the same proportion of the other constituents, if the water content is decreased by about 5%, the power factor will rise by about 30%. On the other hand, if the water content is increased by about 5% the break-down voltage is decreased to about 450 volts.

While for other salts, acids, auxiliary solvents operating and break-down voltages, another percentage of water may give the best results, in general such an optimum water content can be found in all of the cases.

While the water content of the electrolyte is thus quite critical if the most satisfactory results are to be obtained, such water content does not determine the consistency of the electrolyte.

For instance, the above electrolyte which is a viscous liquid can be changed to a pasty or even substantially solid mass without changing the water content or the electric characteristics of the condenser. A suitable way to increase the viscosity of the electrolyte is by the further addition of boric acid. If the boric acid content of the above specified electrolyte rises substantially above one pound, not all the boric acid is dissolved at normal temperature. If as much as two pounds of boric acid is used in the mixture, the electrolyte will appear as a highly viscous, pasty mass, and by using as much as three pounds of boric acid, the electrolyte is made substantially solid. At the same time the same amount of salt and acid being ionized, and the same amount of ionizing solvent being present, the resistance of the electrolyte and the life of the condenser remains substantially the same.

While the consistency of the electrolyte does not affect the electrical properties of the condenser, for mechanical reasons, I prefer not to use either too liquid or too solid electrolytes, but prefer to use semi-fluid or pasty electrolytes.

The water of the solvent instead of being added to the electrolyte or being contained in the salts and/or acids thereof, may be obtained through chemical reaction. For instance, boric acid and glycerine esterify to form boric acid ester of glycerine and water. The ester has a lower dielectric constant than glycerine alone, and the water liberated during the reaction is again the prime ionizing solvent.

To provide for the proper spacing of the electrode foils, especially in case the electrolyte has considerable fluidity, I prefer to interpose a porous mechanical separator between the electrodes. Such separator as well known in the art of electrical devices may be a gauze, fibre, blotting paper or the like. I have found that a specially good separator for mechanical reasons and on account of its cheapness is a relatively narrow meshed material commercially known as crinoline or buckram. Such a separator also acts as a carrier for the electrolyte and might be coated or impregnated with same before the assembly of the condenser in passing it through a suitable mangle.

In the drawing forming part of this specification Fig. 1 is a fractional cross-section of a portion of a condenser embodying my invention.

Fig. 2 is a perspective view of a cylindrical condenser embodying my invention.

Fig. 3 is a perspective view showing a rectangularly shaped condenser embodying my invention also provided with a sealing wrapper.

The condenser, 10, according to my invention, consists of two metal foil electrodes 1 and 2, preferably made from continuous metal bands with the inter-position of a separator 4 also acting as the carrier of the electrolyte 5 containing the ionizing solvent and an inert substance to reduce the fluidity of the electrolyte.

One of the electrodes for instance 1 is made of a film forming metal preferably aluminum, while the other electrode 2 may or may not be of film forming metal. If the condenser is used in filter circuits for the elimination of ripples, it preferably consists of a non-filming metal, or of a filming metal provided with a non-filming coating, for instance, aluminum provided with a chromium plating. However, for alternating current use, both electrodes are preferably made of film forming metal. The electrodes are closely spaced so as to decrease the internal resistance of the condenser. The spacer or separator 4 is preferably a close meshed material as crinoline or buckram. It should be well understood that the thicknesses indicated in the drawing for the foils and interlayer are in no way indicative as to dimensions.

The electrolyte 5 comprises preferably a weak acid as boric, phosphoric, citric or other similar acid, and a salt of a weak acid. The ionizing solvent comprises water and a viscous fluid, for instance glycerine. Terminal wires 8—8 are connected to the electrodes 1 and 2 respectively for the outside connection thereof, the connection between the terminals 8—8 and electrodes 1 and 2 being made in any suitable manner.

The electrodes and the spacer, after the film forming electrode or electrodes have been formed according to the process previously described and the spacer has been properly coated or impregnated with the electrolyte, are wound in a roll as shown in Fig. 2.

It should be, however, noted that such impregnation should preferably not be done under vacuum or at elevated temperature—as is customary in impregnating practice—because the proper water content of the electrolyte is of prime importance, and such under vacuum or heat impregnation, is extremely difficult, if not impossible, to maintain. If desired the condenser may be pressed into a rectangular shape as shown in Fig. 3.

To maintain the proper water content of the electrolyte, I enclose the condenser in a wrapper 20 which is impervious to moisture. However, I provide semi-permeable means on the wrapper, for instance a paraffin wax seal 21 which permits escape of the gases formed in operation without permitting, to any important extent moisture from entering or leaving the condenser. Instead of providing a moisture impervious wrapper, the condenser may be sealed in a metal container and a check-valve provided for the escape of gases.

After the condenser has been assembled, and preferably after it has been wrapped or enclosed in its container, I prefer to subject the condenser to an equalizing electric formation. This formation may be according to various schedules of which, however, I have found the following the most suitable. The voltage is raised in a number of steps to the maximum operating voltage whereby the condenser is maintained at a temperature which substantially corresponds to the temperature at which the condenser has to operate. For instance, in case of a condenser to be used for a maximum voltage of 500 volts and a normal voltage of 350 volts, I raise the voltage to 500 volts in five steps of 100 volts and apply the different voltages for a period of about one to two minutes. After the maximum voltage has been reached the voltage is reduced to 350 volts and applied to the condenser for about 10 minutes. During the whole formation process the ambient temperature is maintained at about 110° F.

I have found that a formation as above described results in a mechanical and electrical equalization of the operative parts of the condenser, which safeguards great uniformity of the condensers and greatly reduces the shrinkage.

The length of the individual steps may be increased, however, no substantial benefits result from such increase.

While I have described my invention in connection with specific embodiments and described specific steps in the process of manufacture, I do not wish to be limited to such embodiments or processes, but desire the appended claims to be construed as broad as permissible in view of the prior arts.

What I claim is new and desire to secure by Letters Patent is:

1. In an electrolytic condenser, a film-forming aluminum electrode, and a second electrode, and a narrow meshed crinoline spacer interposed between said electrodes, said spacer carrying a semi-liquid electrolyte, said electrolyte comprising a weak acid, an ionizing agent and an inert substance to reduce the fluidity of the electrolyte.

2. In the manufacture of electrolytic condensers adapted to withstand voltages of the order of 500 volts and having an electrolyte of low fluidity, the process which includes immersing a strip of aluminum of a purity not less than 99.6% in an electrolytic forming bath and subjecting said aluminum to a formation process, which consists in the immediate application of substantially the full maximum forming voltage, for a period of about 30 seconds.

3. In the manufacture of electrolytic condensers having electrolytes of low fluidity, and formed for operating voltages of several hundred volts, the process which comprises subjecting an aluminum foil of a purity of at least 99.6% to a formation process by immersing the foil into an aqueous electrolyte of high fluidity, applying for formation immediately the full forming voltage, assembling said foil into a condenser having an electrolyte of low fluidity and subjecting said condenser after it is assembled to an equalizing process at a temperature substantially equal to the temperature to which the condenser is subjected in operation.

4. In the manufacture of high voltage electrolytic condensers the steps which comprise, immersing a strip of aluminum in an electrolytic forming bath, applying to said strip immediately the maximum forming voltage for a period of less than a minute, and assembling said formed aluminum strip into a condenser with an electrolyte of low fluidity.

5. An electrolytic condenser comprising two electrodes of which at least one is filmed, said electrodes being closely spaced to each other, and a viscous film-maintaining electrolyte having as ionogen a weak acid and a salt of a weak acid, said ionogen being soluble in water, and an ionizing solvent which dissolves at least the major part of the ionogen, said ionizing solvent comprising between 5% to 30% of water and a viscous alcohol.

6. An electrolytic condenser comprising a filmed aluminum electrode and a viscous film-maintaining electrolyte, said electrolyte comprising as ionogen a weak acid adapted to dissolve in water, and an ionizing solvent, the ionizing solvent consisting of 10% to 30% water and 70% to 90% glycerine and being present in sufficient quantities to dissolve the major part of the ionogen.

7. An electrolytic condenser comprising a filmed aluminum electrode and a film-forming viscous electrolyte comprising as ionogen a weak acid and a salt of a weak acid, said ionogen being soluble in water, said electrolyte comprising an ionizing solvent obtained by mixing 10% to 20% water and 70% to 90% boric acid ester of glycerine, said ionizing solvent being present in sufficient quantities to dissolve at least the major part of the ionogen.

8. An electrolytic condenser comprising a filmed electrode and a pasty film-forming electrolyte, said electrolyte comprising as ionogen a weak acid and a salt of a weak acid, said electrolyte comprising an ionizing solvent having between 5% to 30% water and a second substance having a dielectric constant greater than 25 and being present in sufficient amounts to dissolve the major part of said ionogen, and an inert substance in said electrolyte to reduce the fluidity thereof.

9. An electrolytic condenser comprising a filmed electrode and an electrolyte comprising as ionogen a weak acid and a salt of a weak acid, said ionogen being soluble in water, and an ionizing solvent in said electrolyte, said solvent comprising between 5% to 30% water and a viscous alcohol and being present in a sufficient amount to substantially completely dissolve the ionogen, and an inert substance in the electrolyte to provide for a substantially solid consistency of the electrolyte.

10. An electrolytic condenser comprising a filmed electrode, and an electrolyte comprising as ionogen a weak acid and a salt of a weak acid, said ionogen being soluble in water, and a solvent in the electrolyte to ionize said ionogen, said solvent consisting of 15% to 25% water, and of a viscous polyhydric alcohol, said solvent being present in sufficient quantities to dissolve the major part of said ionogen.

11. An electrolytic condenser comprising a filmed anode, and a cathode closely spaced thereto made of non-filming metal, and a high viscosity film-forming electrolyte interposed between said anode and cathode, said electrolyte comprising as ionogen a weak acid and a salt of a weak acid, and comprising an ionizing solvent to substantially dissolve said ionogen, said solvent comprising 5% to 30% water and a viscous alcohol.

12. An electrolytic condenser having an electrode of aluminum with a purity of at least 99.6%, and a low-fluidity film-forming electrolyte comprising as ionogen a weak acid and a salt of a weak acid, said electrolyte comprising as a solvent water and of a viscous alcohol, said water constituting in weight 5% to 30% of the total ionizing solvent.

13. An electrolytic condenser comprising a filmed anode, and a film-forming electrolyte comprising as ionogen ammonium borate and boric acid, an ionizing solvent in said electrolyte consisting of water, and of a viscous alcohol, said water forming about 25% of the solvent, said solvent being present in sufficient amount to dissolve the major portion of the ionogen.

14. An electrolytic condenser comprising a filmed electrode and a low fluidity film-forming electrolyte, said electrolyte comprising as ionogen a weak acid and a salt of a weak acid, an ionizing solvent consisting of water and of a viscous alcohol, said water forming about 5% to 10% of the solvent and being present in sufficient amount to dissolve the major portion of said ionogen, the optimum water content of said solvent being defined by a sharp increase in power factor for a lower percentage of water, and a sharp decrease of breakdown voltage for a higher percentage of water.

15. In an electrolytic condenser, a filmed electrode and a film-forming electrolyte comprising as an ionogen a weak acid and a salt of a weak acid, said ionogen being soluble in water, and an ionizing solvent in said electrolyte, said solvent consisting of 15% to 25% of water and of a viscous alcohol, the amount of water being 10% to 35% of the soluble ionogen.

16. In the manufacture of electrolytic condensers adapted to withstand voltages of the order of several hundred volts, the process which comprises immersing in a continuous process into a film-forming electrolyte, comprising an aqueous solution of an ionogen, successive portions of an aluminum foil of a thickness of the order of .002 to .004 inch, and applying immediately upon immersion of a foil portion the maximum forming voltage and completing the formation of said foil in a few minutes.

17. In the manufacture of electrolytic condensers, adapted to withstand voltages of the order of 500 volts, the process which includes immersing a strip of film-forming metal in an electrolytic forming bath, and subjecting said strip upon immersion to the maximum forming voltage, and completing the film formation of said strip in less than one minute.

18. In the manufacture of electrolytic condensers adapted to withstand voltages of the order of several hundred volts, the process which includes immersing a strip of aluminum having a thickness of the order of .002 to .004 inch into an electrolytic forming bath, and applying upon immersion the full forming voltage, the duration of said formation being of the order of a few minutes.

19. An electrolytic condenser comprising two electrodes of which at least one is filmed, said electrodes being closely spaced to each other, a viscous film-maintaining electrolyte having as ionogen a salt of boric acid, an ionizing solvent comprising between 5% to 30% water and a viscous alcohol, and boric acid partly dissolved in said electrolyte and partly acting as an inert substance in said electrolyte to reduce the fluidity thereof.

20. An electrolytic condenser comprising a filmed electrode, and another electrode, said electrodes being in close spatial relationship, and a film-maintaining electrolyte comprising an ionogen and a viscous ionizing solvent, said ionizing solvent consisting of between 5% to 30% of water and a viscous ionizing substance having a dielectric constant between 25 and 39 which imparts the viscosity to the solvent.

21. An electrolytic condenser comprising a filmed electrode, and another electrode, said electrodes being in close spatial relationship, and a film-maintaining electrolyte comprising an ionogen and a viscous ionizing solvent, said ionizing solvent consisting of between 15% to 25% of water and a viscous ionizing substance having a dielectric constant between 25 and 39 which imparts the viscosity to the solvent.

22. An electrolytic condenser comprising a filmed electrode and another electrode, said electrodes being in close spatial relationship, and an absorbent spacer between said electrodes and a film-maintaining electrolyte held by such spacer, said electrolyte comprising an ionogen and an ionizing solvent consisting of 5% to 30% of water and of a viscous ionizing substance having a dielectric constant between 25 and 39, said water providing for the major part of the ionization of the electrolyte.

23. An electrolytic condenser comprising a filmed electrode of aluminum having a thickness of the order of .002 to .004 inch and provided with a dense film resulting from the immediate application of about five hundred volts, and an electrolyte comprising as an ionogen a weak acid and a salt of a weak acid, said ionogen being soluble in water, and an ionizing solvent in the electrolyte consisting of 15% to 25% water and of a viscous polyhydric alcohol, said solvent being present in sufficient quantities to dissolve the major part of said ionogen.

24. An electrolytic condenser comprising an aluminum electrode having a thickness of about .002 to .004 inch and a purity of more than 99.6% and having a thin and dense film obtained by the immediate application of a voltage of the order of 500 volts, and a viscous film maintaining electrolyte comprising as an ionogen a weak acid adapted to dissolve in water, and an ionizing solvent consisting of 10% to 30% water and 70% to 90% of viscous polyhydric alcohol, said solvent being present in sufficient quantities to dissolve the major part of the ionogen.

PRESTON ROBINSON.